June 4, 1963 J. D. GOODELL ET AL 3,092,346

MAGNETIC TAPE MAGAZINE

Filed Aug. 19, 1959 2 Sheets-Sheet 1

INVENTORS
JOHN D. GOODELL
BARBARA IVINS
JOHN WISTRAND
BY
Brumbaugh, Free, Graves & Donohue
THEIR ATTORNEYS June 4, 1963 J. D. GOODELL ET AL 3,092,346

MAGNETIC TAPE MAGAZINE

Filed Aug. 19, 1959 2 Sheets-Sheet 2

INVENTORS
JOHN D. GOODELL
BARBARA IVINS
JOHN WISTRAND
BY
Brumbaugh, Free, Graves & Donohue
THEIR ATTORNEYS United States Patent Office
3,092,346
Patented June 4, 1963

3,092,346
MAGNETIC TAPE MAGAZINE

John D. Goodell, Greenwich, Barbara Ivins, Milford, and John C. Wistrand, Stamford, Conn., assignors to Minnesota Mining & Manufacturing Company, St. Paul, Minn., a corporation of Delaware
Filed Aug. 19, 1959, Ser. No. 834,812
5 Claims. (Cl. 242—55.13)

The present invention relates to apparatus for winding strip material of narrow width smoothly on a hub and more particularly to new and improved tape cartridge structure which embodies means for winding the tape on a reel with minimum discontinuity in the side surfaces defined by the reeled tape.

In the current practice, magnetic tape for use in tape recording-reproducing apparatus is supplied in narrow spools of relatively large diameter, the successive layers of tape being superimposed in substantial registry. The necessity for rewinding such tape on the original supply reel presents a number of difficult problems. Desirably, this should be done at high speed so that the recording-reproducing apparatus will not be out of use for an unduly long period. At high tape transport speeds, however, the tape may be subject to rather wide and variable lateral displacements so that the successive layers wound on the reel may not be in substantial registry. As a result, undesirable discontinuities may appear in the side surfaces defined by the reeled tape to the point where there is frictional engagement between an edge of the tape and the adjacent flange of the reel. When this occurs, the tape may either be damaged or it may jam in the reel when an attempt is made to replay it.

It is an object of the invention, accordingly, to provide new and improved tape reeling means that is free from the above-noted deficiencies of the prior art.

Another object of the invention is to provide new and improved means for winding tape and the like on a hub without introducing undesired discontinuities in the side surfaces defined by the reeled tape.

A further object of the invention is to provide a cartridge for tape and the like which embodies means enabling tape to be wound on a reel in the cartridge while maintaining gaps between the surfaces defined by the reeled tape and the adjacent inside walls of the cartridge.

Still another object of the invention is to provide a cartridge for tape and the like which is particularly adapted for use with automatic reeling and unreeling equipment.

Broadly speaking, tape reeling apparatus according to the invention comprises a rotatable hub which is adapted to be driven to wind tape or similar strip material thereon. Mounted for free movement towards and away from the tape receiving portion of the hub and in superimposed relation thereto is a floating guide member for guiding the tape to and from the hub. The guide member is adapted to be positioned by the reeled tape and it has downwardly extending members between which reeled tape is adapted to be received for this purpose. The single turn that is just approaching or leaving the reeled tape or hub at any instant is accurately guided by the guide member which has a guide surface lying in a plane tangent to a generatrix of the reeled tape or hub, and side walls to prevent any appreciable lateral displacement of the tape as it is being reeled or unreeled.

In a preferred embodiment, the hub is journalled in the opposite walls of a shallow container defining a tape cartridge and the guide member is slidably mounted in parallel slots formed in the opposite container walls. The tape is wound on the hub and its free end terminates in a coupling member which is adapted to nest in a recess formed in one edge of the container. In order to facilitate stacking of a plurality of cartridges in automatic tape changer apparatus, for example, "nesting" patterns are formed on the outside surfaces of the opposite walls of each cartridge.

The invention may be better understood from the following detailed description of a typical embodiment, taken in conjunction with the accompanying drawings in which.

Tape reeling apparatus according to the invention is susceptible of wide utility in any application in which it is desired to reel a narrow strip-like material in superimposed registering layers on a hub. For purposes of illustration, however, it will be described herein as applied to a magnetic tape cartridge suitable for use in automatic tape recording-reproducing apparatus of the type disclosed in the copending application Serial No. 837,716, filed September 2, 1959, by John D. Goodell, Barbara Ivins and John Wistrand, for "Magnetic Tape Magazine Changer Mechanism."

Figure 1A:
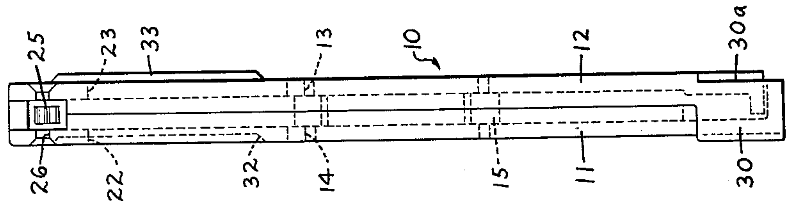
FIG. 1A is a view in side elevation of the cartridge shown in FIG. 1.
Figure 1:
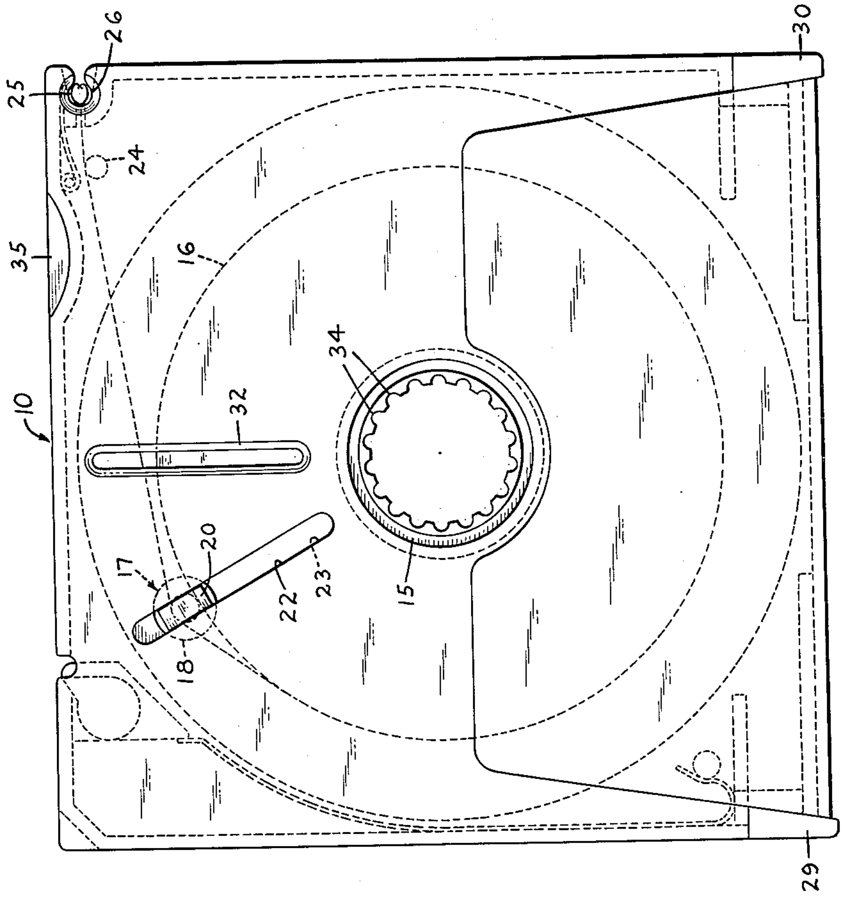
FIG. 1 is a plan view of a tape reeling cartridge constructed according to the invention.

Referring now to FIG. 1, a typical cartridge 10 according to the invention is formed by opposed mating portions 11 and 12 made of translucent or transparent plastic material which are secured together to form a shallow rectangular container. The opposed mating portions 11 and 12 are provided with centrally located apertures 13 and 14 in which is journalled a hub member 15 having a spool of magnetic tape 16 wound thereon.

Within the cartridge 10 is disposed a substantially cylindrical floating guide member 17 having opposed flanges 18 and 19 on which are formed laterally extending projections 20 and 21. The projections 20 and 21 are generally rectangular in cross-section and they are adapted to be received in generally radially extending guide slots 22 and 23 formed in the mating portions 11 and 12 of the cartridge 10.

The inside lower portions of the flanges 18 and 19 on the guide member 17 lie substantially parallel and adjacent to the side surfaces formed by the reeled tape. Thus, they constitute a guide channel which cooperates with the reeled tape to position the guide member 17 correctly. Moreover, the outside faces of the flanges 18 and 19 lie substantially parallel and adjacent to the inside walls of the container portions 11 and 12, respectively. The single turn of tape that is either just leaving the reel of tape or just approaching the reel of tape passes between the upper portions of the flanges 18 and 19 on the guide member 17 which constitute a second guide channel serving to guide the tape on or off the main reel without introducing discontinuities in the side surfaces of the reeled tape. By virtue of this structure, air gaps are always maintained between the inside walls of the cartridge portions 11 and 12 and the reeled tape at the place where the tape is being reeled or unreeled.

Figure 1B:
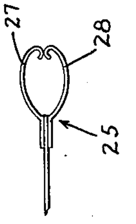
FIG. 1B is an enlarged plan view of the coupling member on the end of the tape in the cartridge shown in FIG. 1.
Figure 1C:
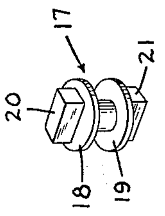
FIG. 1C is a detail view in perspective showing the movable guide member that is used in the cartridge of FIG. 1.

The free end of the tape 16 passes over the guide member 17 and over a fixed guide 24 and terminates in a coupling member 25 which is adapted to be snugly received within an opening or bore 26 formed adjacent one corner of the cartridge 10. As best shown in FIG. 1B, the coupling member 25 may comprise a pair of substantially parallel spring fingers 27 and 28 of a size to grasp snugly a pull member in automatic tape recording and reproducing apparatus of the type disclosed in the aforementioned copending application Serial No. 837,716.

The cartridges 10 are designed to lock together when stacked and to this end they are provided with "nesting patterns" of any suitable shape in their adjacent surfaces. Thus, in FIG. 1A, the cartridge 10 is provided with outwardly projecting corner tabs 29 and 30 which are adapted to be nested snugly in correspondingly shaped recesses 30*a* in the underside of the next cartridge in the stack. Similarly, the upper surface of the cartridge is provided with a radially extending slot 32 which is adapted to receive a locating pad 33 formed on the underside of the next adjacent cartridge in the stack. The slot 32 may also serve as a viewing aperture through which the reeled tape may be seen.

The hub 15 of the cartridge is also provided with one or more grooves 34 around its inner periphery which are adapted to be engaged by suitable drive mechanism to rewind the tape on the hub 15.

The cartridge 10 also has an arcuate recess 35 formed in an upper edge near the bore 26 which is adapted to facilitate indexing of a stack of cartridges selectively to a tape transport position in recording-reproducing apparatus of the type disclosed in the aforementioned application Serial No. 837,716.

While the position of the guide member 17 is not critical, desirably, the guide slots 22 and 23 should preferably be disposed at a suitable angle to maintain the direction of force from the outside layer of tape essentially at right angles to the guide member 17 for various amounts of tape reeled on the hub 15 in the reeling operation. The fixed guide 24 helps to maintain the desired angle between the tape and the guide member 17.

In operation, let it be assumed that the tape originally on the hub 15 has almost all been wound on a takeup spool (not shown) and is to be rewound on the hub 15 at high speed. This is accomplished by driving the hub 15 in the counterclockwise direction by means not shown. The upper portions of the flanges 18 and 19 serve to guide the tape onto the reel in exact registry with the portion of the tape already reeled. As the tape is reeled, the guide member 17 travels outwardly in the slots 22 and 23 until all of the tape has been reeled and the coupling member 25 has come to rest in the bore 26.

In a practical example, 600 feet of tape one-tenth of an inch wide was rewound on a hub about ⅞ inch in diameter in a rectangular cartridge about three and three-quarters inches on an end in 20 seconds without forming any appreciable discontinuities in the side surfaces defined by the reeled tape.

It will be noted that the floating guide member 17 in FIG. 1 is restrained from rotating by the rectangular shape of the projections 20 and 21. Furthermore, the portion of the tape passing over the floating guide member 17 always travels in the same direction as the portion of the reeled tape that is in frictional contact with the lower inside walls of the floating guide member 17. Hence, the guide member is subjected to opposite frictional forces which tend to cancel out so that the guide member 17 is urged to rotate only to the extent that the forces are not equal.

Figure 1D:
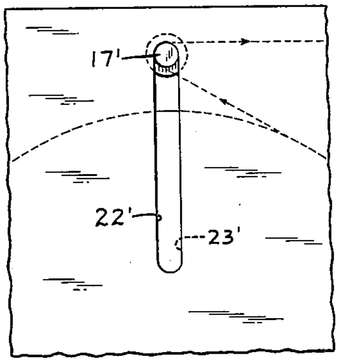
FIGS. 1D, 1E and 1F are detail views of further modifications of the invention.
Figure 1E:
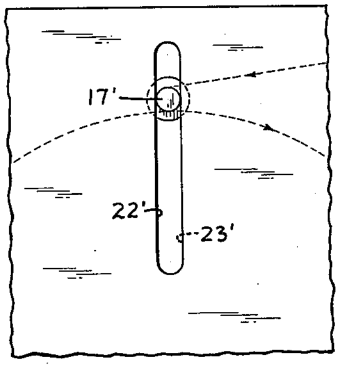

In the form of the invention shown in FIG. 1D, the tape passes under the floating guide and then back around it in the path of egress. In this embodiment, the floating guide member 17′ is urged to rotate in one direction when the tape is being reeled off the hub and in the opposite direction when it is being rewound. If the projections supporting the floating member in the slots 22′ and 23′ are round rather than rectangular, then the slots do not constrain rotation of the guide member. Hence, while the tape is being unreeled from the hub, the guide member 17 is rotated in such a way that it tends to move outwardly along the slots 22′ and 23′ away from the hub, as shown in FIG. 1D. When the tape is being reeled onto the hub, however, the guide member 17 tends to move inwardly along the slots toward the center of the cartridge, as shown in FIG. 1E.

Figure 1F:
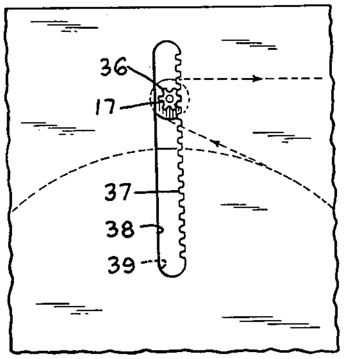

In order to facilitate the action last described, it is desirable in some applications to provide gear teeth 36 on the floating guide member 17 mating with corresponding gear teeth 37 formed in one side of the slots 38 and 39, as shown in FIG. 1F. In some cases, knurled or similar highly frictional surfaces may be adequate and gear teeth may not be necessary.

While the slots supporting the floating guide member are rectilinear in all of the embodiments described above, this is not essential. In some cases, it may be advantageous to employ curved slots to achieve desired operating conditions.

From the foregoing, it will be apparent that the invention provides novel and highly effective tape reeling mechanism which is capable of guiding tape on or off a hub without forming discontinuities in the side surfaces defined by the reeled tape. By virtue of the novel guide member described above which is positioned by the outer portion of the reeled tape and by the inside walls of the tape cartridge, it is possible to reel tape on the hub at high speed while maintaining fixed air gaps between the inside walls of the cartridge and the side surfaces defined by the reeled tape at its outer extremity.

It will be understood that the specific form of the invention described above and illustrated in the drawings is susceptible of modification in form and detail within the spirit of the invention. For example, in certain applications, the flanges on the guide member may not be symmetrical but may extend inwardly towards the center of the reel more than outwardly across the single turn of the tape. Other modifications will be apparent to those skilled in the art. The invention, therefore, is intended to encompass all such modifications as fall within the scope of the following claims.

We claim:

1. In tape reeling mechanism, the combination of a shallow container having parallel opposite walls, a hub journalled in said walls, means forming a tape access opening in said container, a tape having a portion reeled on said hub and an unreeled portion extending through said opening, tape guide means having superimposed opposed guide channels in substantial registry and of substantially the same width as said tape, and means mounting said tape guide means in said container for movement towards and away from said hub with one of said channels fitted over and guided by a peripheral part of said reeled tape portion and with a single wrap of said tape unreeled portion disposed in the other of said guide channels and guided thereby such that when the tape is being reeled on the hub the position of said guided tape unreeled portion is determined by said reeled tape portion.

2. In tape reeling mechanism, the combination of a shallow container having parallel opposite walls, a hub journalled in said walls, a tape having a portion reeled on said hub and an unreeled portion, means forming opposite parallel guide slots in said respective walls and extending outwardly from said hub, a floating guide member comprising a cylindrical guide portion disposed between spaced apart flanges located adjacent said respective walls and guiding a single wrap of said unreeled tape portion, the space between said flanges being of substantially the same width as said tape, and means mounting said guide member for sliding movement without rotation in said slots with said tape reeled portion under said cylindrical guide portion and between said flanges and with a single wrap of said tape unreeled portion over said cylindrical guide portion and between said flanges, such that the position of said guided tape unreeled portion is determined by said reeled tape portion.

3. A tape reeling mechanism as described in claim 1 wherein the mounting means for said tape guide means comprises means forming opposite parallel guide slots in said respective container walls and extending outwardly from said hub, and said tape guide means comprises a floating guide member having a cylindrical guide portion disposed between spaced apart flanges located adjacent said respective walls, and means mounting said guide member in said slots for movement towards and away from said hub.

4. A tape reeling mechanism as described in claim 3 in which said tape unreeled portion passes over said guide member in one direction and under said guide member in a different direction to said tape reeled portion, and the guide member is mounted slidably and rotatably in said slots.

5. A tape reeling mechanism as described in claim 4 together with cooperating means on said guide member and on at least one slot bounding edge in each of said walls for causing rotation of said guide member when moved towards and away from said hub.

References Cited in the file of this patent

UNITED STATES PATENTS

| | | |
|---|---|---|
| 973,018 | Elliott | Oct. 18, 1910 |
| 1,871,234 | Proctor | Aug. 9, 1932 |
| 2,106,374 | Goldhammer et al. | Jan. 25, 1938 |
| 2,366,147 | May | Dec. 26, 1944 |
| 2,805,029 | Fanning | Sept. 3, 1957 |

FOREIGN PATENTS

| | | |
|---|---|---|
| 667,191 | France | June 4, 1929 |
| 330,267 | Great Britain | June 4, 1930 |